United States Patent
Moskal et al.

(10) Patent No.: US 7,339,590 B1
(45) Date of Patent: Mar. 4, 2008

(54) VERTEX PROCESSING UNIT SUPPORTING VERTEX TEXTURE MAPPING

(75) Inventors: Jeffrey B. Moskal, Austin, TX (US); David C. Tannenbaum, Austin, TX (US); Andrew D. Bowen, Austin, TX (US); Jakob Nebeker, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 536 days.

(21) Appl. No.: 10/934,119

(22) Filed: Sep. 2, 2004

(51) Int. Cl.
- *G06F 15/00* (2006.01)
- *G06T 1/00* (2006.01)
- *G06T 11/40* (2006.01)
- *G09G 5/36* (2006.01)

(52) U.S. Cl. .................... 345/501; 345/552; 345/557
(58) Field of Classification Search ............. 345/501, 345/552, 557
See application file for complete search history.

(56) References Cited

U.S. PATENT DOCUMENTS

| | | | |
|---|---|---|---|
| 5,856,829 A * | 1/1999 | Gray et al. ............. | 345/422 |
| 6,717,577 B1 * | 4/2004 | Cheng et al. ........... | 345/419 |
| 6,847,369 B2 * | 1/2005 | Lavelle et al. ......... | 345/558 |
| 6,897,871 B1 * | 5/2005 | Morein et al. .......... | 345/501 |
| 6,900,800 B2 * | 5/2005 | Baldwin ................. | 345/419 |
| 6,972,769 B1 * | 12/2005 | Nebeker et al. ........ | 345/552 |
| 7,015,913 B1 * | 3/2006 | Lindholm et al. ...... | 345/501 |
| 7,027,062 B2 * | 4/2006 | Lindholm et al. ...... | 345/552 |
| 7,109,987 B2 * | 9/2006 | Goel et al. ............. | 345/423 |

\* cited by examiner

*Primary Examiner*—Jin-Cheng Wang
(74) *Attorney, Agent, or Firm*—Townsend and Townsend and Crew, LLP (57) ABSTRACT

A graphics processing subsystem includes a vertex processing unit that allows vertex shader programs to arbitrarily access data stored in vertex texture maps. The vertex processing unit includes a vertex texture fetch unit and vertex processing engines. The vertex processing engines operate in parallel to execute vertex shader programs that specify operations to be performed on vertices. In response to a vertex texture load instruction, a vertex processing engine dispatches a vertex texture request to the vertex texture fetch unit. The vertex texture fetch unit retrieves the corresponding vertex texture map data. While the vertex texture fetch unit is processing a vertex texture request, the requesting vertex processing engine is adapted to evaluate whether instructions that follow the vertex texture load instruction are dependent on the vertex texture map data, and if the instructions are not dependent on the vertex texture map data, to execute the additional instructions.

13 Claims, 6 Drawing Sheets

VERTEX PROCESSING UNIT SUPPORTING VERTEX TEXTURE MAPPING

CROSS-REFERENCES TO RELATED APPLICATIONS

This application is being filed concurrently with U.S. application Ser. No. 10/934,120, entitled "VERTEX TEXTURE CACHE RETURNING HITS OUT OF ORDER," filed Sep. 2, 2004 by Jakob Nebeker and Jeffrey B. Moskal now U.S. Pat. No. 6,972,769, the disclosure of which is incorporated herein by reference.

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Scene geometry is typically represented by geometric primitives, such as points, lines, polygons (for example, triangles and quadrilaterals), and curved surfaces, defined by one or more two- or three-dimensional vertices. Each vertex may have additional scalar or vector attributes used to determine qualities such as the color, transparency, lighting, shading, and animation of the vertex and its associated geometric primitives.

Many graphics processing subsystems are highly programmable, enabling implementation of, among other things, complicated lighting and shading algorithms. In order to exploit this programmability, applications can include one or more graphics processing subsystem programs, which are executed by the graphics processing subsystem in parallel with a main program executed by the CPU. Although not confined to merely implementing shading and lighting algorithms, these graphics processing subsystem programs are often referred to as shading programs or shaders.

One portion of a typical graphics processing subsystem is a vertex processing unit. To enable a variety of per-vertex algorithms, for example for visual effects, the vertex processing unit is highly programmable. The vertex processing unit executes one or more vertex shader programs in parallel with the main CPU. While executing, each vertex shader program successively processes vertices and their associated attributes to implement the desired algorithms. Additionally, vertex shader programs can be used to transform vertices to a coordinate space suitable for rendering, for example a screen space coordinate system. Vertex shader programs can implement algorithms using a wide range of mathematical and logical operations on vertices and data, and can includes conditional and branching execution paths.

Unfortunately, vertex shader programs typically cannot arbitrarily access data stored in memory. This prevents vertex shader programs from using of data structures such as arrays. Using scalar or vector data stored in arrays enables vertex shader programs to perform a variety of additional per-vertex algorithms, including but not limited to advanced lighting effects, geometry effects such as displacement mapping, and complex particle motion simulations. Arrays of data could also be used to implement per-vertex algorithms that are impossible, unpractical, or inefficient to implement otherwise.

One barrier to allowing vertex shader programs to arbitrarily access data in memory is that arbitrary memory accesses typically have large latencies, especially when accessing external memory. When the vertex processing unit must stop vertex shader program execution until data is returned from memory, performance is severely decreased. Caches alone do little to reduce the occurrence of these pipeline stalls, as the size of arrays for some per-vertex algorithms are too large to be cached entirely.

It is therefore desirable for a vertex processing unit of a graphics processing subsystem to enable vertex shader programs to arbitrarily access array data. It is further desirable that the vertex processing unit efficiently access array data while minimizing the occurrence and impact of pipeline stalls due to memory latency.

BRIEF SUMMARY OF THE INVENTION

An embodiment of the invention includes a graphics processing subsystem includes a vertex processing unit that allows vertex shader programs to arbitrarily access data stored in vertex texture maps. The vertex processing unit includes a vertex texture fetch unit and vertex processing engines. The vertex processing engines operate in parallel to execute vertex shader programs that specify operations to be performed on vertices. In response to a vertex texture load instruction, a vertex processing engine dispatches a vertex texture request to the vertex texture fetch unit. The vertex texture fetch unit retrieves the corresponding vertex texture map data. While the vertex texture fetch unit is processing a vertex texture request, the requesting vertex processing engine is adapted to evaluate whether instructions that follow the vertex texture load instruction are dependent on the vertex texture map data, and if the instructions are not dependent on the vertex texture map data, to execute the additional instructions.

In an embodiment, a graphics processing subsystem comprises a vertex texture fetch unit and a plurality of vertex processing engines. Each vertex processing engine is adapted to execute a vertex shader program specifying a series of operations to be performed on a vertex. In response to a vertex texture load instruction of the vertex shader program, the vertex processing engine is adapted to dispatch a vertex texture request to the vertex texture fetch unit. The vertex texture fetch unit is adapted to receive a plurality of vertex texture requests from the vertex processing engines. Each vertex texture request includes at least one texture coordinate specifying a location of vertex texture map data within a vertex texture map. In response to the vertex texture request from one of the plurality of vertex processing engines, the vertex texture fetch unit is adapted to retrieve the vertex texture map data from the location within the vertex texture map specified by the at least one index value of the vertex texture request and to return the vertex texture map data to the requesting vertex processing engine.

In another embodiment, the vertex texture fetch unit is adapted to associate a vertex processing engine ID with the vertex texture request in response to receiving a vertex texture request from one of the plurality of vertex processing engines. The vertex processing engine ID specifies the vertex processing engine dispatching the vertex texture request. The vertex texture fetch unit is adapted to return the vertex texture map data to the vertex processing engine specified by the vertex processing engine ID.

In a further embodiment, each vertex processing engine includes a vertex shader program instruction queue adapted to store a set of vertex shader instructions included in the vertex shader program. The set of vertex shader instructions include vertex texture load instruction. The vertex processing engine also has a register file including a set of data registers adapted to store data used while executing the vertex shader program. Each data register includes a control portion adapted to restrict access to the data register while a vertex texture request is pending. In response to the vertex texture load instruction requesting a vertex texture map data and specifying one of the set data registers as a destination data register for storing the vertex texture map data, the vertex processing engine is adapted to dispatch a vertex texture request to a vertex texture fetch unit. In an additional embodiment, the vertex processing engine is adapted to fetch an additional instruction that follows the vertex texture load instruction in the vertex shader program instruction queue, to evaluate whether the additional instruction is dependent on the vertex texture map data, and in response to a determination that the additional instruction is not dependent on the vertex texture map data, to execute the additional instruction.

DETAILED DESCRIPTION OF THE INVENTION

Figure 1:
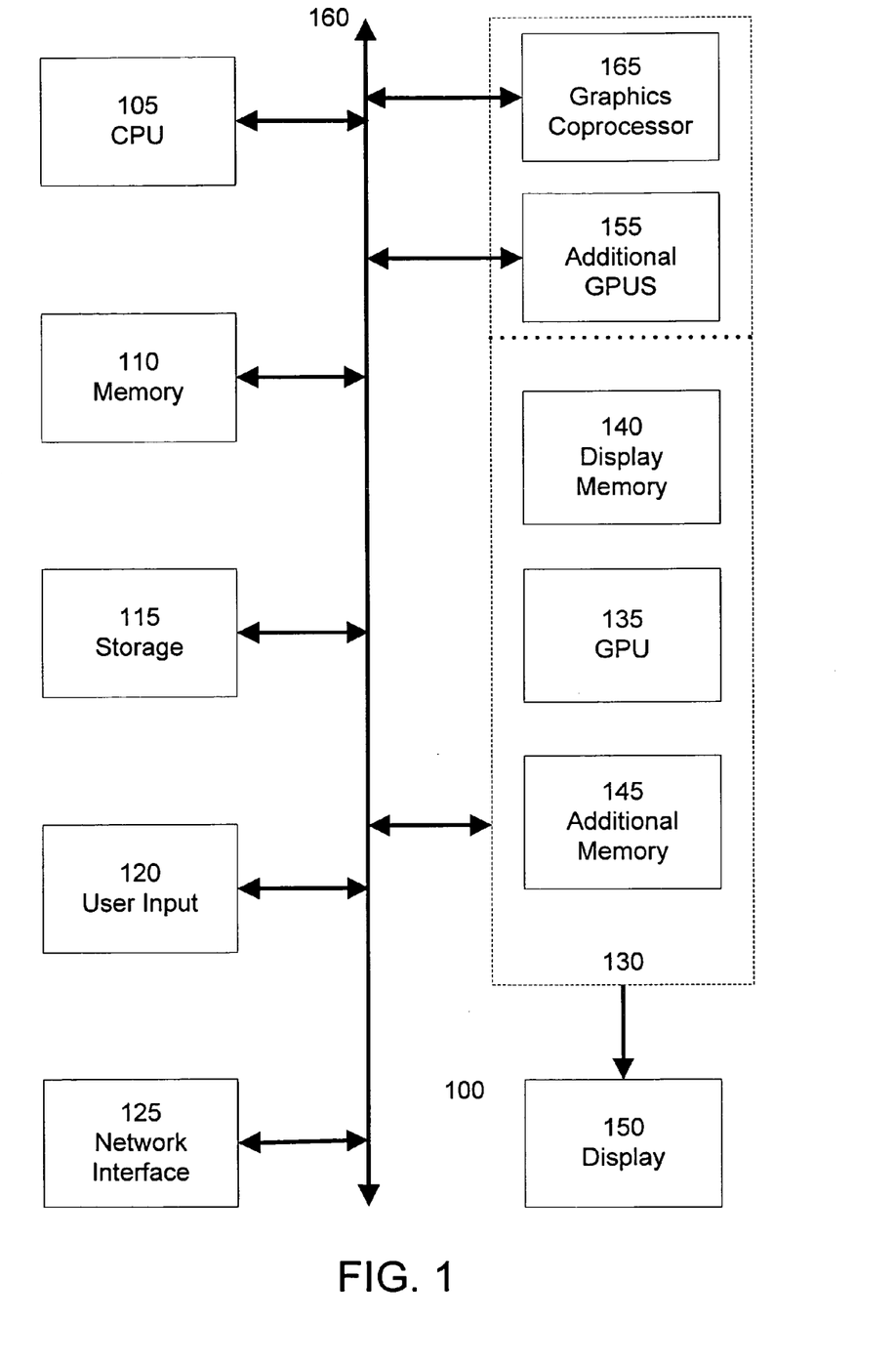
FIG. 1 is a block diagram of an example computer system suitable for implementing an embodiment of the invention.

FIG. 1 is a block diagram of a computer system 100, such as a personal computer, video game console, personal digital assistant, or other digital device, suitable for practicing an embodiment of the invention. Computer system 100 includes a central processing unit (CPU) 105 for running software applications and optionally an operating system. In an embodiment, CPU 105 is actually several separate central processing units operating in parallel. Memory 110 stores applications and data for use by the CPU 105. Storage 115 provides non-volatile storage for applications and data and may include fixed disk drives, removable disk drives, flash memory devices, and CD-ROM, DVD-ROM, or other optical storage devices. User input devices 120 communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160. Examples of data buses include ISA, PCI, AGP, PCI, PCI-Express, and HyperTransport data buses.

A graphics subsystem 130 is further connected with data bus 160 and the components of the computer system 100. The graphics subsystem may be integrated with the computer system motherboard or on a separate circuit board fixedly or removably connected with the computer system. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or commands defining the desired output images, from which the GPU 135 generates the pixel data of one or more output images. The data and/or commands defining the desired output images is stored in additional memory 145. In an embodiment, the GPU 135 generates pixel data for output images from rendering commands and data defining the geometry, lighting, shading, texturing, motion, and/or camera parameters for a scene.

In another embodiment, display memory 140 and/or additional memory 145 are part of memory 110 and is shared with the CPU 105. Alternatively, display memory 140 and/or additional memory 145 is one or more separate memories provided for the exclusive use of the graphics subsystem 130. The graphics subsystem 130 periodically outputs pixel data for an image from display memory 140 and displayed on display device 150. Display device 150 is any device capable of displaying visual information in response to a signal from the computer system 100, including CRT, LCD, plasma, and OLED displays. Computer system 100 can provide the display device 150 with an analog or digital signal.

In a further embodiment, graphics processing subsystem 130 includes one or more additional GPUs 155, similar to GPU 135. In an even further embodiment, graphics processing subsystem 130 includes a graphics coprocessor 165. Graphics processing coprocessor 165 and additional GPUs 155 are adapted to operate in parallel with GPU 135, or in place of GPU 135. Additional GPUs 155 generate pixel data for output images from rendering commands, similar to GPU 135. Additional GPUs 155 can operate in conjunction with GPU 135 to simultaneously generate pixel data for different portions of an output image, or to simultaneously generate pixel data for different output images. In an embodiment, graphics coprocessor 165 performs rendering related tasks such as geometry transformation, shader computations, and backface culling operations for GPU 135 and/or additional GPUs 155.

Additional GPUs 155 can be located on the same circuit board as GPU 135 and sharing a connection with GPU 135 to data bus 160, or can be located on additional circuit boards separately connected with data bus 160. Additional GPUs 155 can also be integrated into the same module or chip package as GPU 135. Additional GPUs 155 can have their own display and additional memory, similar to display memory 140 and additional memory 145, or can share memories 140 and 145 with GPU 135. In an embodiment, the graphics coprocessor 165 is integrated with the computer system chipset (not shown), such as with the Northbridge or Southbridge chip used to control the data bus 160.

Figure 2:
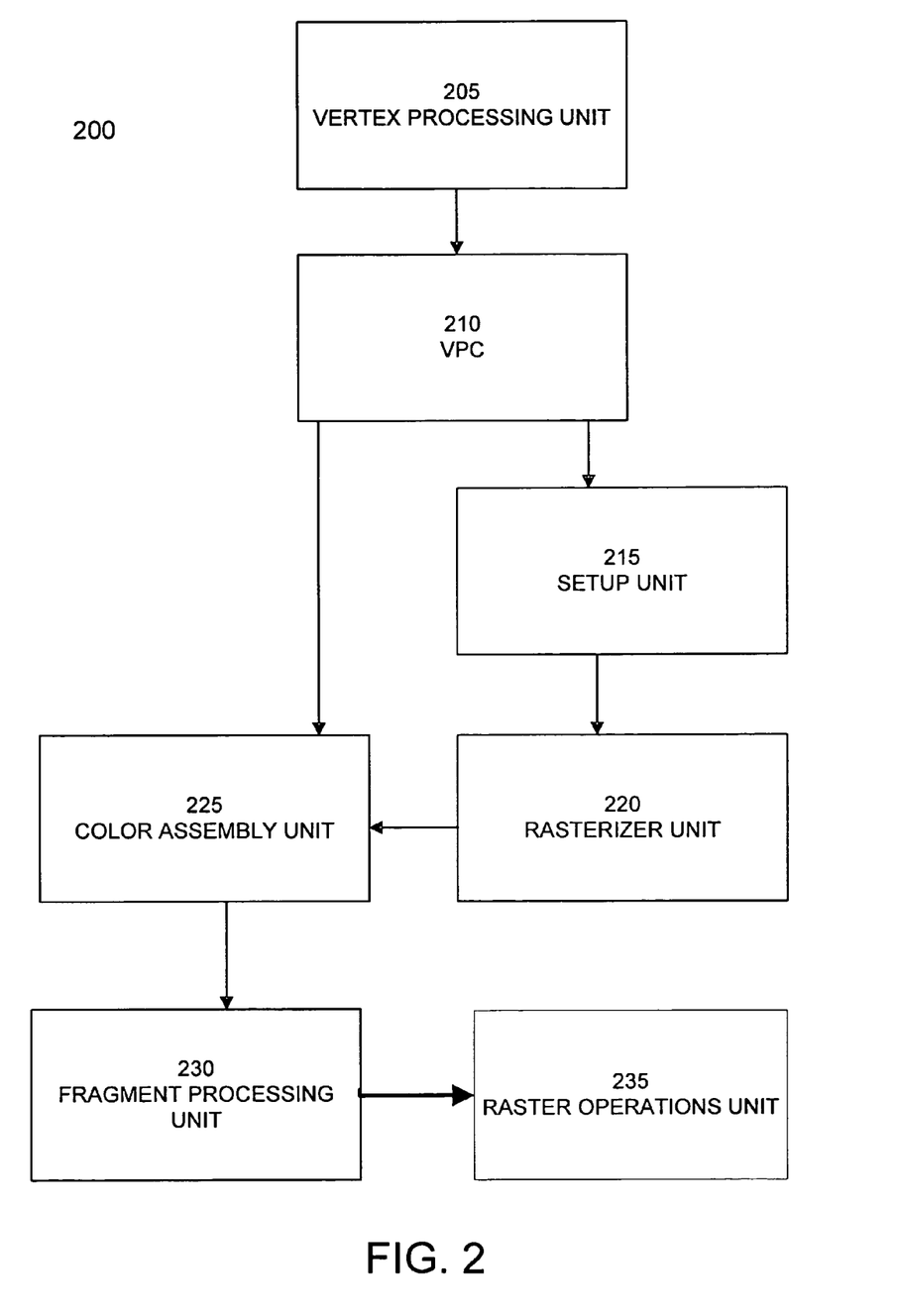
FIG. 2 illustrates a block diagram of a rendering pipeline of a graphics processing subsystem according to an embodiment of the invention.

FIG. 2 illustrates a block diagram of a rendering pipeline 200 of a graphics processing subsystem according to an embodiment of the invention. Pipeline 200 may be implemented in GPU 135 and/or described above. Pipeline 200 includes a vertex processing unit 205, a viewport and culling (VPC) unit 210, a setup unit 215, a rasterizer unit 220, a color assembly block 225, and a fragment processing unit 230.

Vertex processing unit 205, which may be of generally conventional design, receives a geometric representation of a three-dimensional scene to be rendered. In one embodiment, the scene data includes a definitions for objects (e.g., a table, a mountain, a person, or a tree) that may be present in the scene. Objects typically represented as one or more geometric primitives, such as points, lines, polygons (for example, triangles and quadrilaterals), and curved surfaces. Geometric primitives are typically defined by one or more vertices, each having a position that is typically expressed in a two- or three-dimensional coordinate system. In addition to a position, each vertex also has various attributes associated with it. In general, attributes of a vertex may include any property that is specified on a per-vertex basis. In an embodiment, the vertex attributes include scalar or vector attributes used to determine qualities such as the color, transparency, lighting, shading, and animation of the vertex and its associated geometric primitives.

It is typically more convenient to express and manipulate portions of the three-dimensional scene in different coordinate systems. For example, each object may have one or more local coordinate systems. Because objects may have their own coordinate systems, additional data or commands are advantageously provided to position the objects relative to each other within a scene, for example with reference to global coordinate system. Additionally, rendering may be performed by transforming all or portions of a scene from a global coordinate system to a viewport or screen-space coordinate system. In an embodiment, the vertex processing unit 205 transforms vertices from their base position in a local coordinate system through one or more frames of reference to a destination coordinate system, such as a global or screen space coordinate system. In a further embodiment, vertices are specified using a homogeneous coordinate system to facilitate coordinate transformations by the vertex processing unit 205.

Additionally, as discussed in more detail below, the vertex processing unit is highly programmable and can execute vertex shader programs specified by the rendering application. While executing, each vertex shader program successively processes vertices and their associated attributes to implement a variety of visual effects. Numerous examples of such "per-vertex" operations are known in the art and a detailed description is omitted as not being critical to understanding the present invention. Vertex shader programs can implement algorithms using a wide range of mathematical and logical operations on vertices and data, and can includes conditional and branching execution paths.

In addition to performing mathematical and logical operations on vertices, vertex shader programs can arbitrarily access memory to retrieve additional scalar or vector data stored in an array. Vertex shader programs can use the array data to enable vertex shader programs to perform a variety of additional per-vertex algorithms, including but not limited to advanced lighting effects, geometry effects such as displacement mapping, and complex particle motion simulations. Vertex shader programs can also use arrays of data to implement per-vertex algorithms that are impossible, unpractical, or inefficient to implement otherwise.

In the most simple implementation, the data elements of a one- or two-dimensional array are associated with vertices based upon the vertices' positions. For this reason, an array of data associated with one or more vertices is typically referred to as a vertex texture map. However, the term vertex texture map also includes arrays of scalar or vector data of any size and number of dimensions and associated with vertices in any arbitrary way. Unlike texture maps associated with pixels, vertex texture maps do not specify the color, transparency, or other attributes of individual pixels; rather, vertex texture maps specify the attributes of vertices.

Additionally, multiple vertex texture maps can be associated with a set of vertices, for example, with each vertex texture map supplying different parameters to a vertex shader program. The vertex shader program can use data from multiple vertex texture maps separately, can combine data from multiple vertex texture maps, and can use data from one vertex texture map to specify the location of data in another vertex texture map.

The viewport and culling unit 210 culls or discards geometric primitives and/or portions thereof that are outside the field of view or otherwise unseen in the rendered image. By discarding geometric primitives that are not seen in the rendered image, culling decreases the number of geometric primitives to be processed by downstream processing stages of the rendering pipeline 200 and thus increases rendering speed.

Setup unit 215 assembles one or more vertices into a geometric primitive, such as a triangle or quadrilateral. The rasterization stage 220 then converts each geometric primitive into one or more pixel fragments. A pixel fragment defines a set of one or more pixels to be potentially displayed in the rendered image. Each pixel fragment includes information defining the appearance of its pixels, for example screen position, texture coordinates, color values, and normal vectors.

Color assembly block 225 associates the pixel fragments received from rasterizer 220 with the per-vertex attributes, such as vertex colors, depth values, vertex normal vectors, and texture coordinates, received from VPC block 210 and generates additional attributes for interpolating per-vertex attribute values at any point within the pixel fragments. The pixel fragments and associated attributes are provided to fragment processor 230.

Fragment processor 230 uses the information associated with each pixel fragment to determine the output color value of each pixel to be potentially displayed. Like the vertex processor 205, the fragment processing unit is programmable. A pixel fragment program, also referred to as a pixel shader, is executed on each pixel fragment to determine an output color value for a pixel. Although the pixel fragment program operates independently of the vertex shader program, the pixel fragment program may be dependent upon information created by or passed through previous stream processing units, including information created by a vertex program. Rendering applications can specify the pixel fragment program to be used for any given set of pixel fragments. Pixel fragment programs can be used to implement a variety of visual effects, including lighting and shading effects, reflections, texture mapping and procedural texture generation.

The set of pixels are then output to the raster operations and storage unit 235. The raster operations unit 235 integrates the set of pixels output from the fragment processing unit 230 with the rendered image. Pixels can be blended or masked with pixels previously written to the rendered image. Depth buffers, alpha buffers, and stencil buffers can also be used to determine the contribution of each incoming pixel, if any, to the rendered image. The combination of each incoming pixel and any previously stored pixel values is then output to a frame buffer, stored for example in display memory 140, as part of the rendered image.

Figure 3:
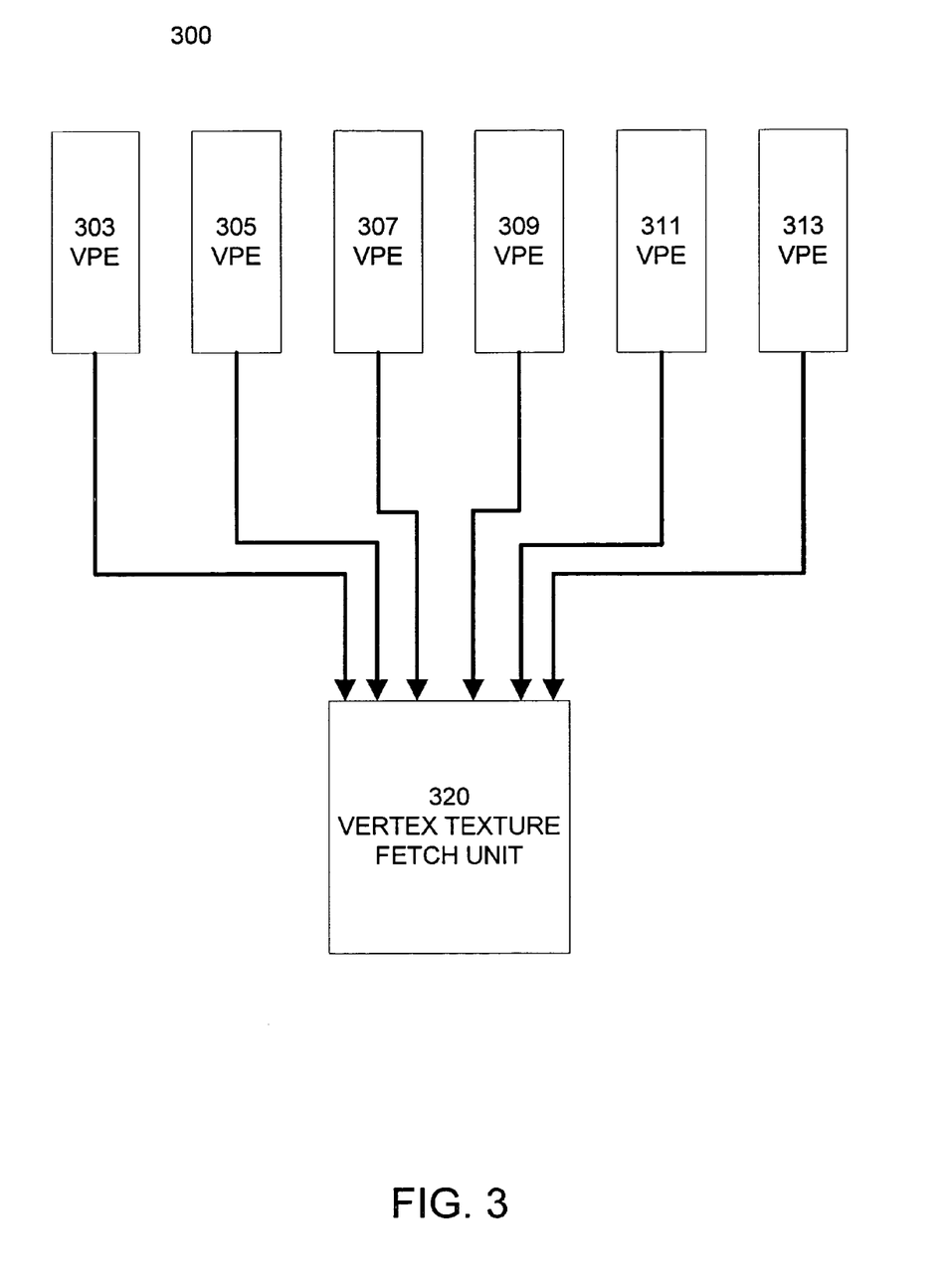
FIG. 3 illustrates a portion of the vertex processing unit according to an embodiment of the invention.

FIG. 3 illustrates a portion 300 of the vertex processing unit according to an embodiment of the invention. Portion 300 includes vertex processing engines 303, 305, 307, 309, 311, 313. Each vertex processing engine can independently execute a vertex shader program. As discussed above, each vertex processing engine executes its vertex shader program and successively processes vertices and their associated attributes to implement a per-vertex algorithm. The per-vertex algorithm can be used to perform any combination of a wide variety of lighting, shading, coordinate transformation, geometric, and animation effects.

The use of multiple vertex processing units operating in parallel improves execution performance. In the example of portion 300, there are a total of six vertex processing engines; therefore, portion 300 can simultaneously execute a total of six different vertex shading programs, six instances of the same vertex shading program, or any combination in between. In alternate embodiments, the vertex processing unit can include any number of vertex processing engines. In an additional embodiment, each vertex processing engine is multithreaded, enabling the execution of multiple vertex shading programs.

In the embodiment of portion 300, each vertex processing engine dispatches vertex texture requests to a vertex texture fetch (VTF) unit 320. Each vertex processing engine dispatches a vertex texture requests to the VTF unit 320 when its vertex shader program includes an instruction to access data from an array. A vertex texture request includes a set of attributes used to locate the requested data. In an embodiment, these attributes include one or more texture coordinates (depending upon the number of dimensions in the vertex texture map), texture ID, and a texture level of detail (LOD). Here, the one or more texture coordinates represent index value(s) specifying a location of vertex texture map data within a vertex texture map. In a further embodiment, these attributes also include a thread ID specifying the execution thread of the vertex processing engine requesting data from a vertex texture map. All of these attributes can be expressed in any numerical format, including integer, fixed-point, and floating-point formats.

Figure 4:
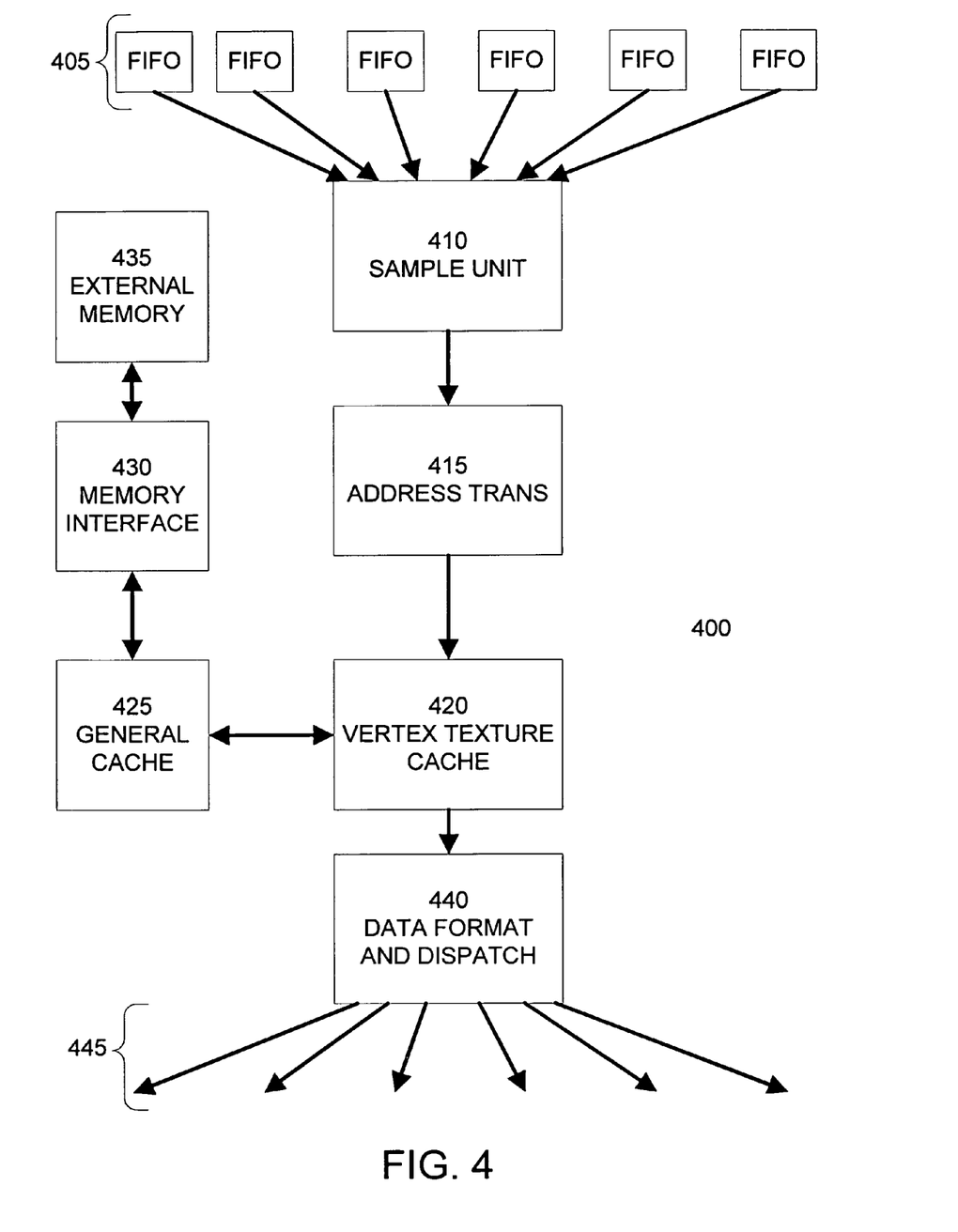
FIG. 4 illustrates a vertex texture fetch unit according to an embodiment of the invention.

FIG. 4 illustrates a vertex texture fetch (VTF) unit 400 according to an embodiment of the invention. VTF unit 400 includes a set of input buffers 405, in an embodiment each of which receives vertex texture requests from one of vertex processing engines. Sample unit 410 reads vertex texture requests from each of the set of input buffers 405 in turn, for example in a round-robin manner. In an embodiment, as the sample unit 410 reads a vertex texture request from one of the set of input buffers 405, it assigns a vertex processing engine ID to the request, so that once the request is completed, the data is returned to the correct vertex processing engine.

Using the texture ID of the vertex texture request, the sample unit 410 retrieves texture state information associated with the requested vertex texture map. Texture state information includes a base memory address for the vertex texture map, the number of dimensions of the vertex texture map, the size of each dimension of the vertex texture map, the format of the data in the vertex texture map (for example, scalar or vector), and texture boundary conditions (for example, when texture coordinates fall outside the vertex texture map, the texture coordinates can be clamped at the boundary, mirrored, or wrapped around to the other side of the vertex texture map). It should be noted that the VTF unit 400 can retrieve data from vertex texture maps of any arbitrary size, rather than being limited to textures with dimensions that are powers of two.

Using the texture coordinates and LOD value included in the vertex texture request and the texture state information, the sample unit 410 calculates a memory address for the data requested by the vertex texture request. This calculation is analogous to that used to calculate a memory address of an array element from a set of one or more array indices. For example, a memory address for data in a two-dimensional vertex texture map is calculated by multiplying the texture width by one of the texture coordinates and adding the result to the other texture coordinate to calculate a first offset value. The LOD value is used to determine a second offset value. The first and second offset values are then added to the texture base address to calculate the memory address for the requested vertex texture data.

Figure 5A:
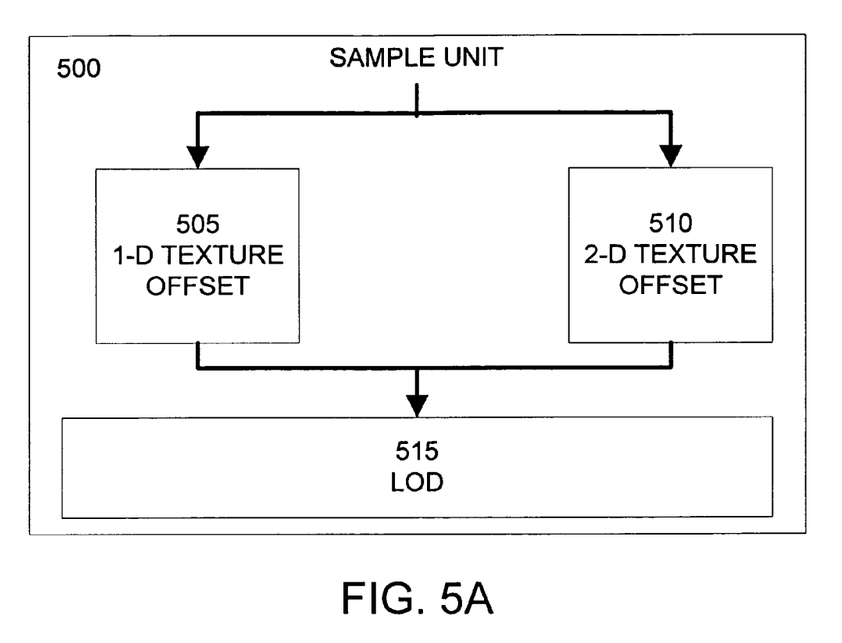
FIGS. 5A and 5B illustrate sample units according to an embodiment of the invention.

FIGS. 5A and 5B illustrate sample units according to an embodiment of the invention. In FIG. 5A, sample unit 500, corresponding to the sample unit 410 discussed with reference to FIG. 4, includes two dedicated vertex texture map memory address calculation units, 505 and 510. Upon receiving a vertex texture request, sample unit 500 determines from the texture state information whether the vertex texture map referenced by the vertex texture request is a one-dimensional or two-dimensional vertex texture map. If the vertex texture request references a one-dimensional vertex texture map, then sample unit 500 directs the texture request to unit 505 to compute the appropriate offset. Conversely, texture requests for two-dimensional vertex texture maps are directed to unit 510. Following the calculation of the offset in unit 505 or unit 510, LOD unit 515 completes the memory address computation.

Figure 5B:
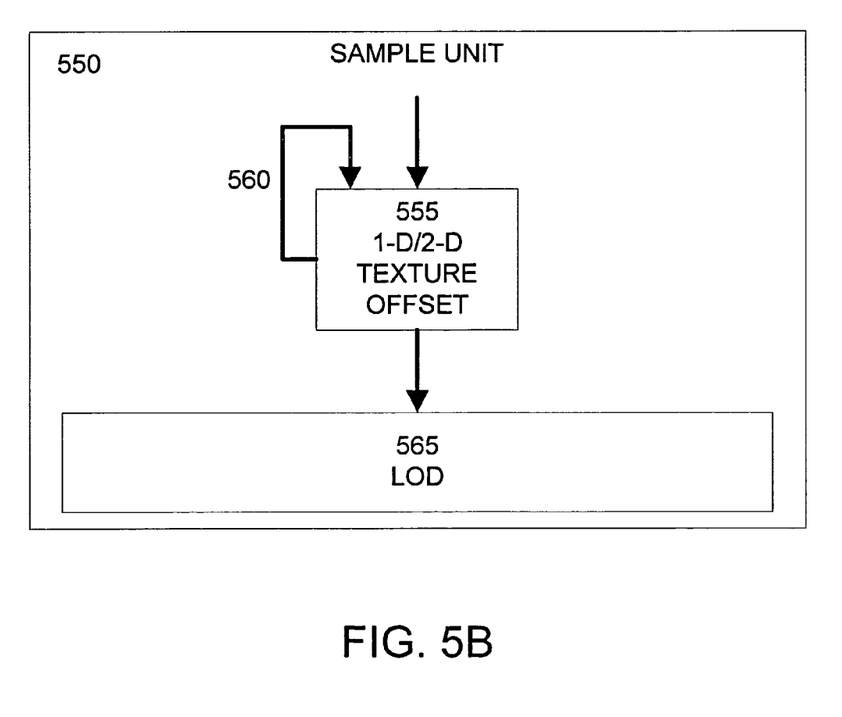

FIG. 5B illustrates an alternate implementation 550 of sample unit 410. Unit 550 includes a vertex texture map memory address calculation unit 555. Vertex texture requests for both one-dimensional vertex texture maps and two-dimensional vertex texture maps are directed to unit 555. For a one-dimensional vertex texture request, unit 555 computes an offset value and outputs it to LOD unit 565. For a two-dimensional vertex texture request, unit 555 first computes a first-dimension offset value and outputs it to LOD unit 565. Then, unit 555 recycles data corresponding to the two-dimensional vertex texture request via a return path 560 (shown in the FIG. 5B as being outside of unit 555 for illustrative purposes, but may reside within unit 555), in order to compute a second-dimension offset value and output it to LOD unit 565. Thus, it takes two "passes" through unit 555 to process each two-dimensional vertex texture request. Because unit 555 is pipelined, it may perform other processes between these two "passes." For example, if a two-dimensional texture request is followed by a one-dimensional vertex texture request, the order of processing through unit 555 may be as follows: (A) first "pass" of the two-dimensional texture request, (B) the one-dimensional texture request, (C) second "pass" of two-dimensional texture request. In this manner, one-dimensional vertex texture requests may leapfrog two-dimensional texture requests in the sample unit 550.

Returning to the VTF unit 400 in FIG. 4, the memory address calculated by sample unit 410 is processed by address translation unit 415. In the present embodiment of the invention, the memory address calculated by sample unit 410 is a virtual memory address. Address translation unit 415 translates the virtual memory address to a physical memory address.

The physical memory address from address translation unit 415 is sent to vertex texture cache unit 420. Vertex texture cache unit 420 includes a cache memory for storing recently accessed vertex texture map data. In an embodiment, unit 420 forms a cache tag value from the physical memory address. Each entry of the cache memory of unit 420 stores recently accessed vertex texture map data and a tag value used to identify the memory address where the data is stored in memory. If the tag value associated with the vertex texture request matches any of the tag values stored in the cache memory of cache unit 420 (referred to as a cache hit), the corresponding vertex texture map data value is output from the vertex texture cache unit. Conversely, if the tag value associated with the vertex texture request does not match any of the tag values stored in the cache memory of unit 420 (referred to as a cache miss), then the vertex texture request is dispatched to the general cache 425.

General cache 425 is a cache memory for the entire rendering pipeline and stores data recently accessed by many different parts of the rendering pipeline, including the vertex processing unit (including but not limited to the texture fetch unit) and the fragment processing unit. General cache 425 uses the tag value in a similar manner as described above. If the tag value of the vertex texture request matches a tag value stored in the general cache 425, then general cache 425 returns the corresponding data value, which in this case is vertex texture map data, back to the vertex texture cache unit 420. Otherwise, if there is a cache miss in general cache 425, the texture request is sent to memory interface 430. Memory interface 430 then retrieves the vertex texture map data from the specified physical memory address in external memory 435, and returns the vertex texture map data back to the vertex texture cache unit 420, which in turn outputs the data. In a further embodiment, data received by the vertex texture cache unit 420 from the general cache 425 or external memory 435 is stored in the cache memory of vertex texture cache unit 420, for example using a least recently used replacement scheme to overwrite vertex texture cache data previously stored.

In an embodiment, vertex texture cache unit 420 does not stall when there is a cache miss. Instead, the vertex texture cache unit 420 dispatches the vertex texture request to the general cache 425. While waiting for a response from the general cache 425 or external memory 435 to this first vertex texture request, the vertex texture cache unit 420 will receive and process the next vertex texture request. If the next vertex texture request is a cache hit, the vertex texture cache unit 420 immediately outputs the corresponding vertex texture map data value, without waiting for the vertex texture map data for the first vertex texture request to be returned from the general cache 425 or external memory 435. If the next vertex texture request is a cache miss, then the vertex texture cache unit 420 dispatches this request to the general cache 425 as well.

The vertex texture cache unit 420 repeats this operation for additional vertex texture requests. As vertex texture map data is returned from the general cache 425 or external memory 435, the vertex texture cache unit 420 outputs the data. It should be noted that this embodiment of the vertex texture cache unit 420 may output vertex texture map data in a different order than the vertex texture requests are received, with the output order depending on the latency of the general cache 425 and/or external memory 435 and whether cache misses and cache hit are interleaved. This embodiment of the vertex texture cache unit 420 is discussed in detail in the cross-referenced patent application Ser. No. 10/934,120 entitled "Vertex Texture Cache Returning Hits Out of Order".

Vertex texture map data output by vertex texture cache unit 420, regardless of whether it was retrieved from the cache memory of vertex texture cache unit 420, the general cache 425, or external memory 435, is sent to data format and dispatch unit 440. Data format and dispatch unit 440 formats the vertex texture map data to match the format specified by the vertex texture request. In an embodiment, if the vertex texture request specifies a scalar value, x, then data is formatted as (x, 0, 0, 1). Conversely, vector data, (x, y, z, w), is left unchanged. The data format and dispatch unit 440 then examines the vertex processing engine ID associated with the vertex texture request and dispatches the formatted vertex texture map data and its thread id, which is carried over from the associated vertex texture request, as represented by signals 445, to the appropriate vertex processing engine. In one embodiment, returned data such as the formatted vertex texture map data is transferred from dispatch unit 440 to appropriate vertex processing engines through the use of one or more FIFO units (not shown), which allow more than one set of returned data to be stored and made available for a particular vertex processing engine.

Figure 6:
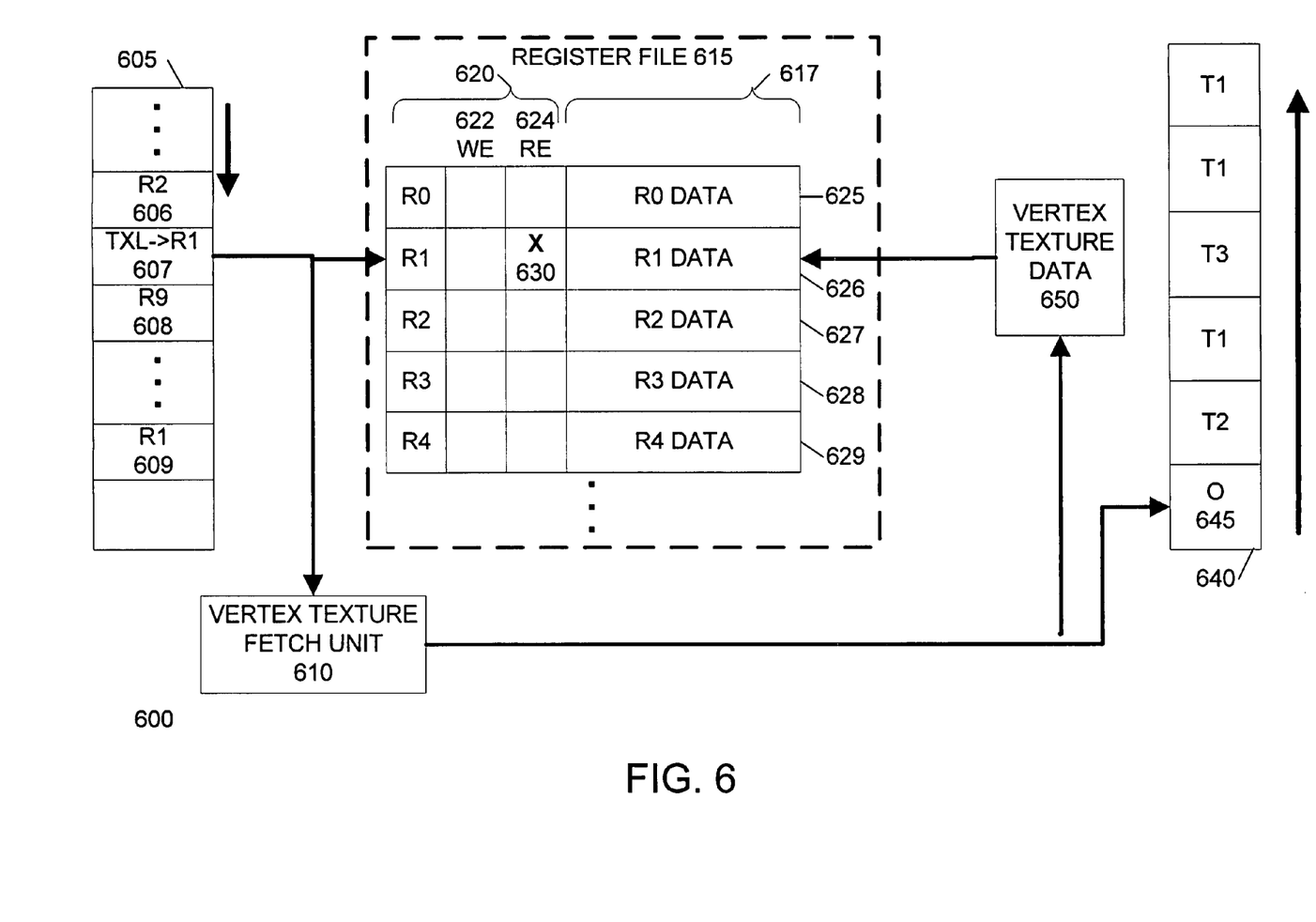
FIG. 6 illustrates a portion of a vertex processing engine according to an embodiment of the invention.

FIG. 6 illustrates a portion 600 of a vertex processing engine, such as those discussed in FIG. 3, according to an embodiment of the invention. As discussed above, the vertex processing engine executes one or more vertex shader programs. Each vertex shader program is comprised of one or more vertex shader program instructions. Vertex shader program instructions can direct the vertex processing engine to perform a variety of different mathematic on vertices and data. Vertex shader program instructions also include conditional and branching execution instructions that can direct the flow of execution of vertex shader programs on the vertex processing engine.

The portion 600 of the vertex processing engine 600 includes an instruction queue 605. Instruction queue 605 includes a number of vertex shader program instructions, including instructions 606, 607, 608, and 609. Unless directed otherwise by an instruction, the vertex processing engine executes instructions in the instruction queue 605 in sequence.

Many, though not all, instructions read or write data to one or more of the data registers in the register file 615. Register file 615 includes a number of data registers to be used as temporary data storage while executing vertex shader programs, including registers R0, 625, R1, 626, R2, 627, R3, 628, and R4, 629. In the example of FIG. 6, instruction 606 accesses register R2, 627, instruction 607 accesses register R1, 626, instruction 608 accesses register R9 (not shown), and instruction 609 accesses register R1, 626. Alternate embodiments may have any number of data registers depending upon the data storage needs of vertex shader programs executed by the vertex processing engine.

In register file 615, each data register includes a data portion 617 for storing data used by the vertex shader program and a control portion 620 for controlling access to the data portion of the register. The use of the control portion 620 for processing vertex texture requests is discussed in more detail below.

For most instructions, the vertex processing engine can read an instruction, complete the operation specified by the instruction, and continue on to the next instruction in the vertex shader program. However, some vertex texture request instructions require the retrieval of additional data from a memory location specified by the instruction. As discussed above, the vertex processing engine must dispatch a vertex texture request to the vertex texture fetch unit for completion. The latency, or time required to complete the request, varies depending on whether the requested vertex texture map data already in a cache; however, even in the best case, the typical latency may be much greater than the time needed by the vertex processing engine to process other instructions. If the vertex processing engine were to wait until a vertex texture request was completed before executing any further vertex shader program instructions, performance would be severely diminished.

To prevent this, the vertex processing engine illustrated in FIG. 6 attempts to executes subsequent instructions while waiting for a vertex texture request to be completed. In an embodiment, upon reaching a vertex texture load (TXL) instruction 607 in the program queue 605, the portion 600 dispatches a vertex texture request to the vertex texture fetch unit 610, as discussed above. The vertex texture request can be generated from attributes in the TXL instruction 607, such as a texture ID and texture coordinates, as well as state information from the vertex processing engine itself, such as a thread id.

Vertex texture load instructions explicitly or implicitly specifies a data register as the destination for the vertex texture map data returned in response to the vertex texture request. In this example, instruction 607 specifies register R1, 626, as the destination for the vertex texture map data. In preparation for executing instructions subsequent to the TXL instruction 607 while awaiting completion of the vertex texture request, portion 600 updates the control portion 620 of the destination data register of vertex texture request. In an embodiment, the control portion 620 of each data register includes a write enable attribute 622 and a read enable attribute 624. In this example, upon dispatching a vertex texture request in response to instruction 607, portion 600 also sets the read enable attribute 630 of register 626 to false.

Following the dispatch of the vertex texture request and updating the control portion of the destination data register, the vertex processing engine can execute instruction 608 and any other instructions following instruction 607. By setting the read enable attribute 630 of destination data register 626 to false, the vertex processing engine will be prevented from executing any instructions following instruction 607 and dependent on the value of data register R1, 626, until the vertex texture request is completed. In summary, the read enable attribute of each register specifies when it is safe for an instruction to read from the register. Thus, portion 600 will continue to retrieve and execute instructions in the instruction queue 605 uninterrupted.

Instruction 609 references the destination data register 626. When the vertex shader program execution reaches instruction 609 in the instruction queue 605, the portion 600 analyzes the instruction 609 and the control portion of the destination data register. If the read enable attribute 630 is still set to false, then the vertex texture request has not finished retrieving and storing vertex texture map data in the destination data register 626. If the instruction 609 is dependent on all or part of the value of the destination data register 626 and the read enable attribute 630 is set to false, for example if instruction 609 reads all or part of the data stored in the destination data register 626, then vertex processing engine must halt execution of this vertex shader program and wait for the vertex texture request to complete.

However, even in this worst case situation, the vertex processing engine was able to process all of the instructions between the TXL instruction 607 and the dependent instruction 609, which may number for example in the tens or hundreds. Furthermore, the amount of idle time spent by the vertex processing engine waiting for the vertex texture request to be completed is reduced, because although the vertex texture request was dispatched when instruction 607 was executed, the vertex processing engine will not stall, if at all, until it reaches instruction 609, which may be a substantial time later. Thus, by the time the vertex processing engine stalls on instruction 609, the vertex texture request may be substantially completed. In a further embodiment, if the vertex processing engine reaches instruction 609 before the vertex texture request is complete, the vertex processing engine will switch to another thread of execution until the vertex texture request of the stalled thread is complete.

As discussed above, the vertex texture fetch unit 610 returns vertex texture map data and a thread ID to the requesting vertex processing engine. Upon receiving vertex texture map data from the vertex texture fetch unit 610, regardless of whether the vertex processing engine is stalled or not, an embodiment of portion 600 stores the vertex texture map data in buffer 650 in preparation of transferring this data to the destination register 626 in the register file 615. In an embodiment, access to the register file 615 is controlled by register file access pipeline 640. Register file access pipeline 640 arbitrates register file access for one or more threads executed by the vertex processing engine, such as threads T1, T2, and T3. The vertex processing engine pulls access requests from the end of the register file access pipeline 640 and accesses the register file 615 in the manner specified by the access request.

In an embodiment, portion 600 inserts a bubble 645, or empty space, at the beginning of the register file access pipeline 640. As other access requests in the register file access pipeline 640 are processed, the bubble 645 advances towards the end of the pipeline 640. When the bubble 645 reaches the end of the register file access pipeline 640, the vertex texture map data in buffer 650 is transferred to the destination data register 626. Additionally, portion 600 sets the read enable attribute 630 to true, indicating that the vertex texture request dispatched in response to instruction 607 is completed. If the vertex shader program execution has not yet reached instruction 609, then this instruction will be executed normally and without interruption if or when the vertex processing engine reaches it. If the vertex shader program execution has already arrived at instruction 609 and stalled because of the value of the read enable attribute 630, the upon setting this attribute 630 to true, the vertex shader program will resume. In a further embodiment, the vertex processing engine interleaves the execution of instructions from different threads, for example by executing one or more instructions from a first thread, followed by executing one or more instructions from a second thread. Upon receiving vertex texture map data from a vertex texture request of a given thread, the vertex texture map data will be held until the vertex processing engine returns to executing the given thread.

Some vertex shader programs may overwrite all or portions of a destination data register for vertex texture map data with instructions subsequent to the associated TXL instruction. This can occur for a number of different reasons. First, the vertex texture shader program may be poorly optimized, so that it includes redundant TXL instructions. Alternatively, the vertex shader program may be highly optimized to compensate for vertex texture map latency by speculatively issuing a TXL instruction used by one conditional branch of execution as early as possible to hide the latency. By the time later instructions determine that the branch of execution associated with this TXL instruction is going to be executed, the vertex texture map data has already been retrieved and stored in the destination register. Conversely, the vertex texture map data is discarded if an alternate branch of execution is followed. Additionally, vertex texture map data may be combined or partially overwritten on a per-component basis. For example, if the vertex texture map data is a vector, the vertex shader program may overwrite some of the vector components with new values, but preserve the value of other vector components.

In an embodiment, the vertex processing engine ensures that vertex texture map data returned in response to a TXL instruction does not overwrite all or portions of the destination data register modified by instructions subsequent to the TXL instruction. In this embodiment, when an instruction writes data to all or a portion of a data register, portion 600 first examines the read enable attribute for the data register. If the read enable attribute is set to false, then portion 600 sets the write enable attribute for this register to false and sets the read enable attribute to true. The updated data value can then be written to the data register. When the vertex texture map data is later returned in response to the previously executed TXL instruction, portion 600 examines the write enable attribute for the destination data register. If the write enable attribute of the destination data register is set to false, portion 600 discards the vertex texture data and sets the write enable attribute back to true. Conversely, if the write enable attribute of the destination data register is true, then portion 600 stores the vertex texture map data in the destination data register. In summary, the write enable attribute indicates if it is safe for vertex texture map data returned by the vertex texture fetch unit to be stored in the destination data register.

In a further embodiment, the vertex processing engine tracks instruction dependencies and overwritten data on a per-component basis. For example, vector data may include four components (x,y,z,w). Other types of data, such as color, may also have multiple components and can be stored in a data register in a similar matter. In this embodiment, the data portion 617 of each data register can store all of the components of a vector. In a further embodiment, the data portion 617 of each data register can also be used to store a scalar value. For vector data, vertex shader program instructions can read or write any or all of the components stored in a data register.

In an embodiment, the control portion 620 associated with each data register has attributes that can be set on a per-component basis. For example, if a data register can hold data with four components, then write enable and read enable attributes each have four values, allowing the write enable and read enable attributes for each component to be set separately.

In an example, if a TXL instruction requests a four component vertex texture map data value (x,y,z,w) to be loaded into register R1, 626, then the read enable attribute for register R1, 626, will be set to (false, false, false, false). Continuing with this example, if subsequent to the TXL instruction, but prior to the vertex texture map data being returned, another instruction overwrites the x and y components of the destination data register, 626, then the corresponding read enable attributes will be set to true, because these component values are no longer dependent on the vertex texture map data being fetched. In this example, the read enable attribute of data register 626 is changed to (true, true, false, false). Similarly, the write enable attribute must be set to (false, false, true, true), so that the vertex texture map data returned does not overwrite the new values of the x and y components. Because of this change in the read enable attributes of the destination data register, further instructions dependent only on the x and y components of the destination data register can be subsequently executed without stalling.

When the vertex texture map data is returned to the vertex processing engine, the write enable attribute of the destination data register instructs the vertex processing engine to discard the now-outdated x and y components of the returned vertex texture map data, and only the remaining z and w components are stored in the destination data register. Finally, because the vertex texture request has now been fulfilled, the write enable attributes and read enable attributes of the destination data are both set to (true, true, true, true) so that the destination data register can be accessed without restrictions. In one embodiment, if all of the write enable attributes of the destination data register are set to false, the pipeline bubble 645 is not inserted into the register file access pipeline 640 and the vertex texture map data is discarded. In an alternative embodiment, a pipeline bubble 645 is inserted into the register file access pipeline 640 when the vertex texture map data is received by the vertex processing engine. When the pipeline bubble 645 reaches the top of the register file access pipeline 640, the write enable attributes of the destination data register are checked to see if some or all of the vertex texture map data should be discarded, rather than written to the destination data register.

In a further embodiment, the vertex processing engine ensures that any pending vertex texture requests at the end of execution of one thread do not adversely effect the operation of a new thread. In one aspect of this embodiment, when the last instruction of a thread is executed by a vertex processing engine or when the system terminates a thread running on the vertex processing engine, the write enable attributes for any destination data registers are set to false. Thus, when the vertex texture map data requested by an expired thread is returned to the vertex processing engine, it is discarded. In an additional embodiment, if the last instruction of a thread is a TXL instruction, then this instruction is ignored and no vertex texture request is dispatched by the vertex processing engine.

This invention enables a vertex processing unit of a graphics processing subsystem to execute vertex shader programs that arbitrarily access array data while minimizing the occurrence and impact of pipeline stalls due to memory latency. Although the invention has been described with reference to several example vertex shader programs, the invention may be used to execute vertex shader programs accessing data in arbitrary memory locations for any purpose. The invention has been discussed with respect to specific examples and embodiments thereof; however, these are merely illustrative, and not restrictive, of the invention. While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A graphics processing subsystem including:
   a vertex texture fetch unit adapted to receive a vertex texture request from a vertex processing engine, the vertex texture request including at least one index value specifying a location of vertex texture map data within a vertex texture map, the vertex texture fetch unit further comprising:
   a sample unit adapted to compute a memory address corresponding to the location of the vertex texture map data within a vertex texture map specified by the at least one index value of the vertex texture request; and
   a vertex texture cache unit adapted to output the vertex texture map data, the vertex texture cache unit including a vertex texture cache memory adapted to store a copy of at least a portion of at least one vertex texture map, wherein the vertex texture cache unit is adapted to request the vertex texture map data specified by the vertex texture request from a location in a graphics memory corresponding with the memory address in response to a determination by the vertex texture cache unit that the vertex texture cache memory is not storing a copy of the vertex texture map data; and
   a vertex processing engine adapted to execute a vertex shader program specifying a series of operations to be performed on a vertex and, in response to an instruction of the vertex shader program, to dispatch a vertex texture request to the vertex texture fetch unit;
   wherein in response to the vertex texture request, the vertex texture fetch unit is adapted to retrieve the vertex texture map data from the location within the vertex texture map specified by the at least one index value of the vertex texture request and to return the vertex texture map data to the vertex processing engine.

2. The graphics processing subsystem of claim 1, wherein the vertex processing engine is adapted to calculate the at least one index value of the vertex texture request by executing a portion of the series of operations specified by the vertex shader program.

3. The graphics processing subsystem of claim 2, wherein the vertex processing engine is adapted to calculate the at least one index value of the vertex texture request from at least one input parameter associated with the vertex.

4. The graphics processing subsystem of claim 1, wherein the sample unit is adapted to fetch vertex texture state data corresponding with a texture ID included in the vertex texture request, the vertex texture state data including a vertex texture map base address and at least one vertex texture map size.

5. The graphics processing subsystem of claim 4, wherein the sample unit is adapted to determine the memory address from the vertex texture map base address and an offset value calculated using the at least one index value.

6. The graphics processing subsystem of claim 5, wherein the sample unit includes:
   a first offset calculation pipeline adapted to calculate an offset value for a vertex texture request including a single index value; and
   a second offset calculation pipeline adapted to calculate an offset value for a vertex texture request including a plurality of index values, wherein the sample unit is adapted to determine the memory address corresponding with the vertex texture request in parallel with a memory address corresponding to a second vertex texture request.

7. The graphics processing subsystem of claim 5, further including a data format and dispatch unit adapted to convert the vertex texture map data to a data format indicated by the vertex texture request and to return the converted vertex texture map data to the vertex processing engine.

8. A graphics processing subsystem, comprising:
   a vertex texture fetch unit adapted to receive a plurality of vertex texture requests from a plurality of vertex processing engines, each vertex texture request including at least one index value specifying a location of vertex texture map data within a vertex texture map, the vertex texture fetch unit further comprising:
   a sample unit adapted to compute a memory address corresponding to the location of the vertex texture map data within a vertex texture map specified by the at least one index value of the vertex texture request; and
   a vertex texture cache unit adapted to output the vertex texture map data, the vertex texture cache unit including a vertex texture cache memory adapted to store a copy of at least a portion of at least one vertex texture map, wherein the vertex texture cache unit is adapted to request the vertex texture map data specified by the vertex texture request from a location in a graphics memory corresponding with the memory address in response to a determination by the vertex texture cache unit that the vertex texture cache memory is not storing a copy of the vertex texture map data; and
   a plurality of vertex processing engines, each vertex processing engine adapted to execute a vertex shader program specifying a series of operations to be performed on a vertex and, in response to a vertex texture load instruction of the vertex shader program, to dispatch a vertex texture request to the vertex texture fetch unit;
   wherein in response to the vertex texture request from one of the plurality of vertex processing engines, the vertex texture fetch unit is adapted to retrieve the vertex texture map data from the location within the vertex texture map specified by the at least one index value of the vertex texture request and to return the vertex texture map data to the one of the plurality of vertex processing engines.

9. The graphics processing subsystem of claim 8, wherein in response to receiving a vertex texture request from one of the plurality of vertex processing engines, the vertex texture fetch unit is adapted to associate a vertex processing engine ID with the vertex texture request, the vertex processing engine ID specifying the one of the plurality vertex processing engines dispatching the vertex texture request, and to return the vertex texture map data to the vertex processing engine specified by the vertex processing engine ID.

10. The graphics processing subsystem of claim 8, wherein the sample unit is adapted to fetch vertex texture state data corresponding with a texture ID included in the vertex texture request, the vertex texture state data including a vertex texture map base address and at least one vertex texture map size.

11. The graphics processing subsystem of claim 8, further comprising a graphics memory device adapted to store graphics data including a vertex texture map including the vertex texture map data.

12. The graphics processing subsystem of claim 8, wherein each vertex processing engine comprises:
- a vertex shader program instruction queue adapted to store a set of vertex shader instructions included in the vertex shader program, the set of vertex shader instructions including the vertex texture load instruction; and
- a register file including a set of data registers adapted to store data used while executing the vertex shader program, each data register including a control portion adapted to restrict access to the data register while a vertex texture request is pending;
- wherein, in response to the vertex texture load instruction of the vertex shader program instruction queue requesting a vertex texture map data and specifying one of the set data registers as a destination data register for storing the vertex texture map data, the vertex processing engine is adapted to dispatch a vertex texture request to a vertex texture fetch unit.

13. The graphics processing subsystem of claim 8, the vertex processing engine is adapted to fetch an additional instruction that follows the vertex texture load instruction in the vertex shader program instruction queue, to evaluate whether the additional instruction is dependent on the vertex texture map data, and in response to a determination that the additional instruction is not dependent on the vertex texture map data, to execute the additional instruction.

* * * * *